US009292810B2

(12) United States Patent
Allam et al.

(10) Patent No.: US 9,292,810 B2
(45) Date of Patent: Mar. 22, 2016

(54) RE-FACTORING, RATIONALIZING AND PRIORITIZING A SERVICE MODEL AND ASSESSING SERVICE EXPOSURE IN THE SERVICE MODEL

(71) Applicant: International Business Machines Corporation, Armonk, NY (US)

(72) Inventors: Abdul Allam, Raleigh, NC (US); Ali P. Arsanjani, Fairfield, IA (US); Shuvanker Ghosh, Tampa, FL (US); Kerrie L. Holley, Montara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/253,896

(22) Filed: Apr. 16, 2014

(65) Prior Publication Data
US 2014/0304677 A1    Oct. 9, 2014

Related U.S. Application Data

(63) Continuation of application No. 12/698,401, filed on Feb. 2, 2010, now Pat. No. 8,739,111.

(51) Int. Cl.
| G06F 17/30 | (2006.01) |
| G06Q 10/06 | (2012.01) |
| G06F 9/44 | (2006.01) |
| G06Q 10/00 | (2012.01) |

(52) U.S. Cl.
CPC ........ *G06Q 10/06* (2013.01); *G06F 9/44* (2013.01); *G06Q 10/0637* (2013.01); *G06Q 10/0639* (2013.01); *G06Q 10/30* (2013.01)

(58) Field of Classification Search
CPC .................................. G06F 9/44; G06Q 10/06
See application file for complete search history.

(56) References Cited

U.S. PATENT DOCUMENTS

| 7,159,185 B1 | 1/2007 | Vedula et al. |
| 7,194,485 B2 | 3/2007 | Kaipa et al. |
| 7,315,826 B1 * | 1/2008 | Guheen et al. ............... 705/7.29 |
| 7,581,205 B1 | 8/2009 | Massoudi |

(Continued)

OTHER PUBLICATIONS

Brooke Jazmond Taylor, USPTO Office Action, U.S. Appl. No. 12/698,401, Mail Date Sep. 26, 2012, 10 pages.
Brooke Jazmond Taylor, USPTO Final Office Action, U.S. Appl. No. 12/698,401, Notification Date May 9, 2013, 16 pages.

(Continued)

*Primary Examiner* — Idriss N Alrobaye
*Assistant Examiner* — Brooke Taylor
(74) *Attorney, Agent, or Firm* — John R. Pivnichny; Madeline F. Schiesser; Keohane & D'Alessandro PLLC

(57) ABSTRACT

Provided herein are approaches to re-factor, rationalize, and prioritize a service model, and to assess service exposure in the service model. At least one approach provides: determining a granularity of one or more services of the service model; re-factoring and refining a service portfolio and a hierarchy of the service model; adapting a Service Litmus Test (SLT) and service exposure scope to the service model; applying Service Litmus Tests (SLTs) to the service model; and verifying, with each affected stakeholder associated with the service model, that the service model achieves business and technical needs based on the results of the SLTs, which include tests to make exposure decisions, including whether to expose the service or not expose the service, wherein the service represent business capabilities and are placed in the hierarchy of the service model which represents the granularity.

20 Claims, 9 Drawing Sheets

(56) References Cited

U.S. PATENT DOCUMENTS

2004/0177335 A1    9/2004   Beisiegel et al.
2008/0126147 A1*   5/2008   Ang et al. .......................... 705/7
2008/0312979 A1*  12/2008   Lee et al. .......................... 705/7
2009/0222429 A1    9/2009   Aizenbud-Reshef et al.

OTHER PUBLICATIONS

Brooke Jazmond Taylor, USPTO Notice of Allowance and Fee(s) Due, U.S. Appl. No. 12/698,401, Date Mailed Jan. 17, 2014, 18 pages.

* cited by examiner

Figure 3    SERVICE REFACTORING AND RATIONALIZATION FLOW

Figure 7    Scoring Table

↙ 700

| SLT | SLT Questions | Scoring Level | | | | | | Comments |
|---|---|---|---|---|---|---|---|---|
| | | 0 (When answered negative) | 1 | 2 | 3 | 4 | 5 | |
| SLT1 Business Alignment  If the service is not traceable back to a business task or goal, it may not yield benefits required for SOA implementation. | SLT1-1  Does the service provide a required business functionality that supports business processes and goals? Is there a business goal that this service directly (versus "inherits" from its children) supports? | Does not support the business processes and business goals at all | Weakly supports the business process and business goals | | | | Strongly supports the business process and business goals | The more support from business the better |
| | SLT1-2  Is the business willing to fund the service through its lifecycle: provisioning, management, governance and maintenance? | Business not willing to fund the service at all | Very limited funding available | | | | Funding available | The stronger the financial support the better |
| | SLT1-3  Is the business willing to share the service internally or externally with clients or business partners? For example implications may be additional costs, business secrets, security, etc. | No sharing | Very limited sharing | | | | Completely shared | The higher the cross channel and LOB usage the better |

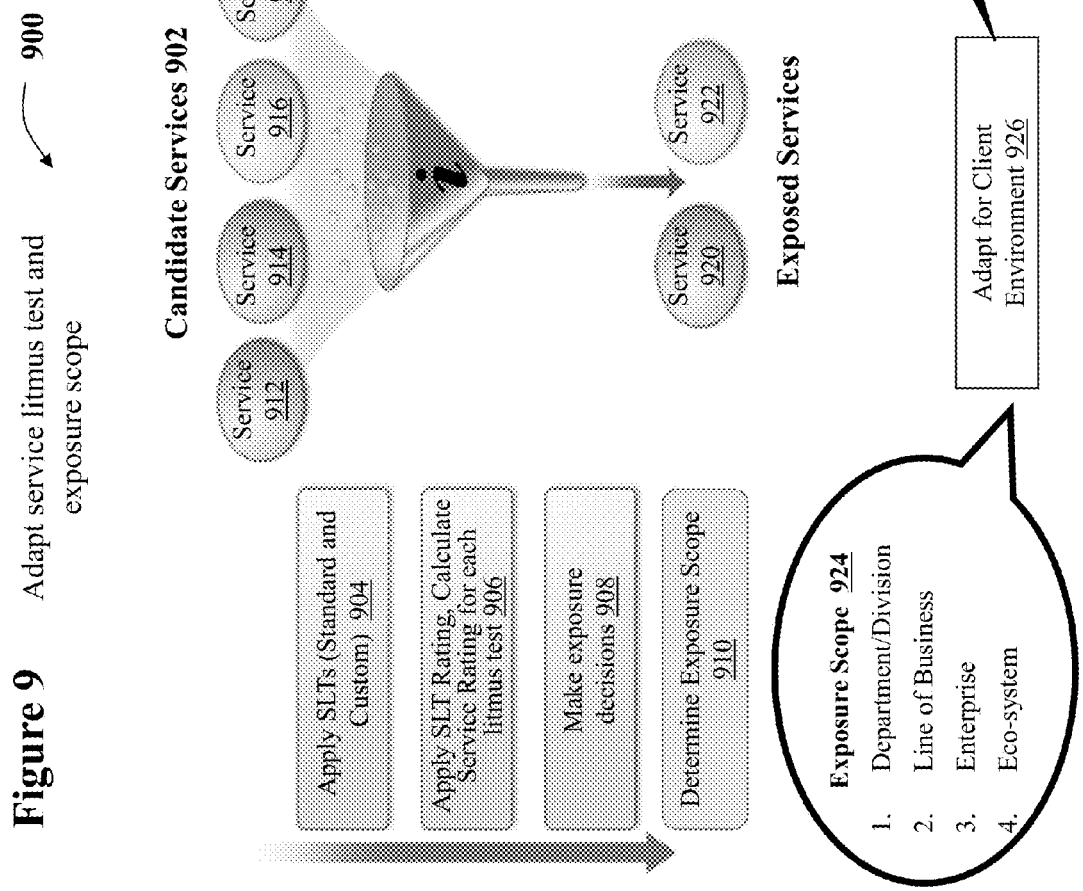

RE-FACTORING, RATIONALIZING AND PRIORITIZING A SERVICE MODEL AND ASSESSING SERVICE EXPOSURE IN THE SERVICE MODEL

CROSS-REFERENCE TO RELATED APPLICATIONS

This application is a continuation of, and claims the benefit of, and co-owned U.S. patent application Ser. No. 12/698,401, filed Feb. 2, 2010, the entire contents of which are herein incorporated by reference.

FIELD OF THE INVENTION

The present invention relates to a method or system to re-factor, rationalize, and prioritize a service model and a toolkit to assess service exposure in the service model.

BACKGROUND OF THE INVENTION

The industry has moved to increased adoption of Service Oriented Architecture (SOA). Enterprises are adopting SOA because they are able to recognize the industry trends as they mature and are able to determine how their internal pain points can be resolved by SOA and business to IT alignment. With the increased adoption of SOA, these services are becoming the cornerstone of enterprise assets, and enterprises are funding to build these services as enterprise assets more and more.

A problem exists in the prior art in that, with the increased adoption of SOA and rush to build services, there exists a need to ensure the services in the service portfolio are business aligned, composable, reusable, technically feasible (coarse grain vs. fine grain), and can meet service level agreements. Further, IT funding may be limited, whether it is good economic times or bad economic times, and hence funding to build the services as enterprise assets may also be limited and prioritization of the services in the service portfolio is essential to build these enterprise assets over time.

SUMMARY OF THE INVENTION

Provided herein are approaches to re-factor, rationalize, and prioritize a service model, and to assess service exposure in the service model. At least one approach provides: determining a granularity of one or more services of the service model; re-factoring and refining a service portfolio and a hierarchy of the service model; adapting a Service Litmus Test (SLT) and service exposure scope to the service model; applying Service Litmus Tests (SLTs) to the service model; and verifying, with each affected stakeholder associated with the service model, that the service model achieves business and technical needs based on the results of the SLTs, which include tests to make exposure decisions, including whether to expose the service or not expose the service, wherein the service represent business capabilities and are placed in the hierarchy of the service model which represents the granularity.

One approach provides a method for determining which services in a service model to expose, the method comprising: determining a granularity of one or more services of the service model; re-factoring and refining a service portfolio and a hierarchy of the service model; adapting a Service Litmus Test (SLT) and service exposure scope to the service model; applying Service Litmus Tests (SLTs) to the service model; and verifying, with each affected stakeholder associated with the service model, that the service model achieves business and technical needs based on the results of the SLTs, which include tests to make exposure decisions, including whether to expose the service or not expose the service, wherein the service represent business capabilities and are placed in the hierarchy of the service model which represents the granularity.

Another approach provides a computer program product stored on a computer readable storage device for implementing a method to re-factor, rationalize, and prioritize a service model and a toolkit to assess service exposure in the service model, the service model determining which service to expose, the computer program product comprising: a computer readable storage media; program instructions for determining a granularity of the one or more services of the service model; program instructions for re-factoring and refining a service portfolio and a hierarchy of the service model; program instructions for adapting a Service Litmus Test (SLT) and service exposure scope to the service model; program instructions for applying Service Litmus Tests (SLTs) to the service model; program instructions for determining service exposure scope of the service model; program instructions for verifying, with each affected stakeholder associated with the service model, that the service model achieves business and technical needs based on the results of the SLTs, which include tests to make exposure decisions, including whether to expose the service or not expose the service, wherein the service represent business capabilities and are placed in the hierarchy of the service model which represents the granularity.

Yet another approach provides a method for deploying a computing infrastructure comprising integrating computer-readable code into a computing system, wherein the code in combination with the computing system is capable of assessing service exposure in the service model and determining which services to expose, the process comprising: determining a granularity of one or more services of the service model; re-factoring and refining a service portfolio and a hierarchy of the service model; adapting a Service Litmus Test (SLT) and service exposure scope to the service model; applying Service Litmus Tests (SLTs) to the service model; and verifying, with each affected stakeholder associated with the service model, that the service model achieves business and technical needs based on the results of the SLTs, which include tests to make exposure decisions, including whether to expose the service or not expose the service, wherein the service represent business capabilities and are placed in the hierarchy of the service model which represents the granularity.

BRIEF DESCRIPTION OF THE DRAWINGS

These and other features of this invention will be more readily understood from the following detailed description of the various aspects of the invention taken in conjunction with the accompanying drawings in which:

FIG. 7 illustrates an embodiment of scoring table of the present invention.

FIG. 9 illustrates another embodiment of a method and pictorial model of adapting service litmus test and exposure scope of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

To be dedicated to every client's success means, in this context, to be sure one is building the right service portfolio for the client, that has the highest relevance to what they do, what their objectives are, and what they aspire to achieve. Therefore, periodically the service model needs to be reviewed as it stands, infant or mature, and validate its relevance from a client's perspective. This process is called rationalizing the service model (or portfolio). This review can lead to changes (called re-factoring) in the service model due to a re-prioritization. Some services will become more important; others will sink in priority. At any event, re-factoring of this service model may be required. Thus, the service re-factoring and rationalization capability pattern is created.

In service re-factoring and rationalization, the service model is reviewed, re-factored, and refined the service portfolio and service hierarchy, exposure decisions are made, and finally the service model and its constituent parts are rationalized based on the re-factoring and exposure decisions. In this capability pattern, another capability that is called the Service Litmus Test can be leveraged.

Figure 1:
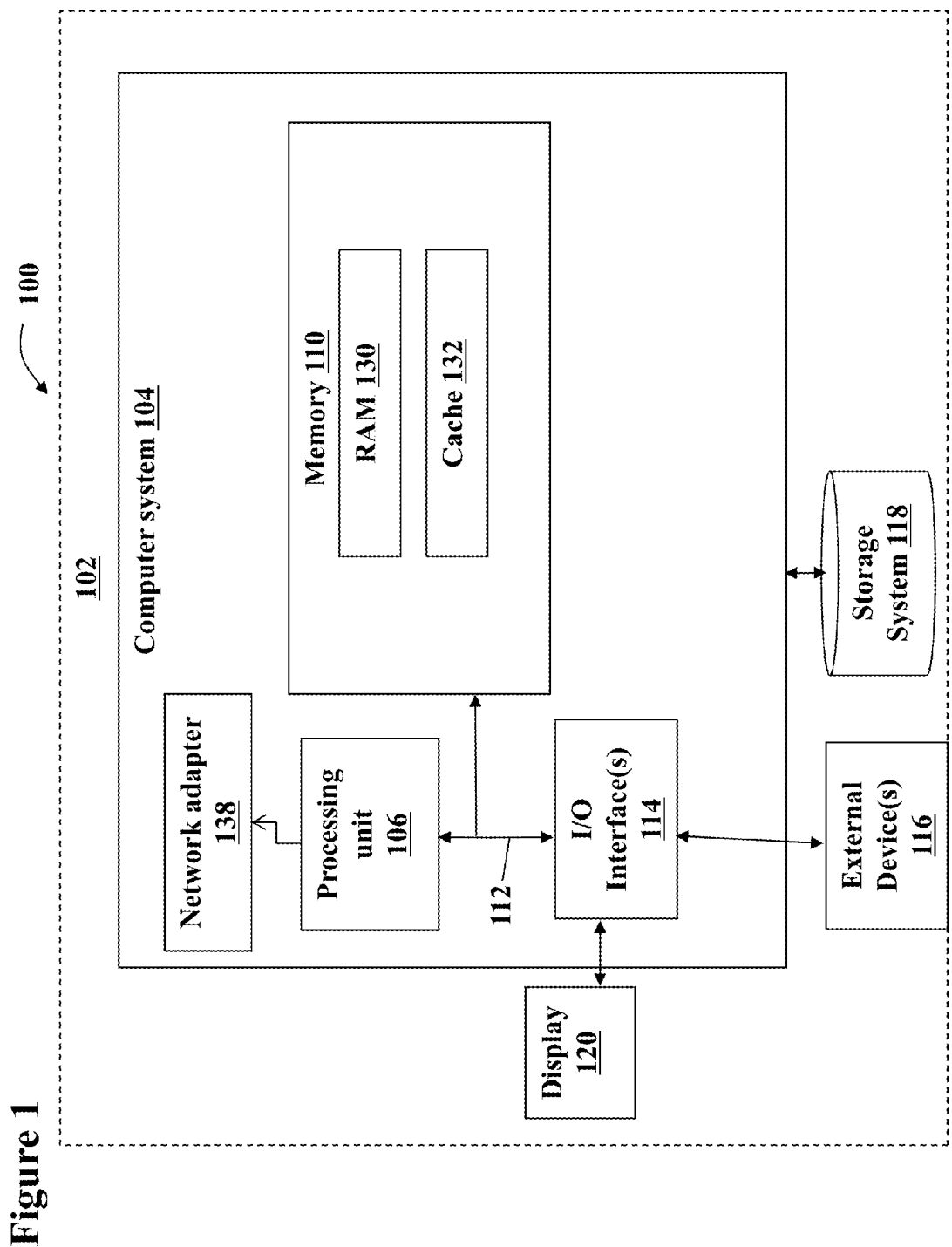
FIG. 1 shows a data processing system suitable for implementing an embodiment of the present invention.

FIG. 1 shows a system 100 that may have a data processing system 102 suitable for implementing an embodiment of the present invention. Data processing system 102 may have a computer system 104 connected to a display 120, external device(s) 116 or other peripheral devices for providing a user an interface to computer system 104 being connected via I/O interface(s) 114. Computer system 104 may have an internal bus 112 for providing internal communication between such modules as processing unit 106, I/O interface(s) 114, network adapter 138 and memory 110. Memory 110 may have random access memory (RAM) 130, cache 132 and storage system 118 or other forms of memory. RAM may take the form of integrated circuits that allow stored data to be accessed in any order, that is, at random. Storage system 118 may take the form of tapes, magnetic discs, and optical discs and are generally used for long-term storage of data. Cache 132 is a memory for storing a collection of data-duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or re-computing the original data. A cache has proven to be extremely effective in many areas of computing because access patterns in typical computer applications have locality of reference.

Figure 2:
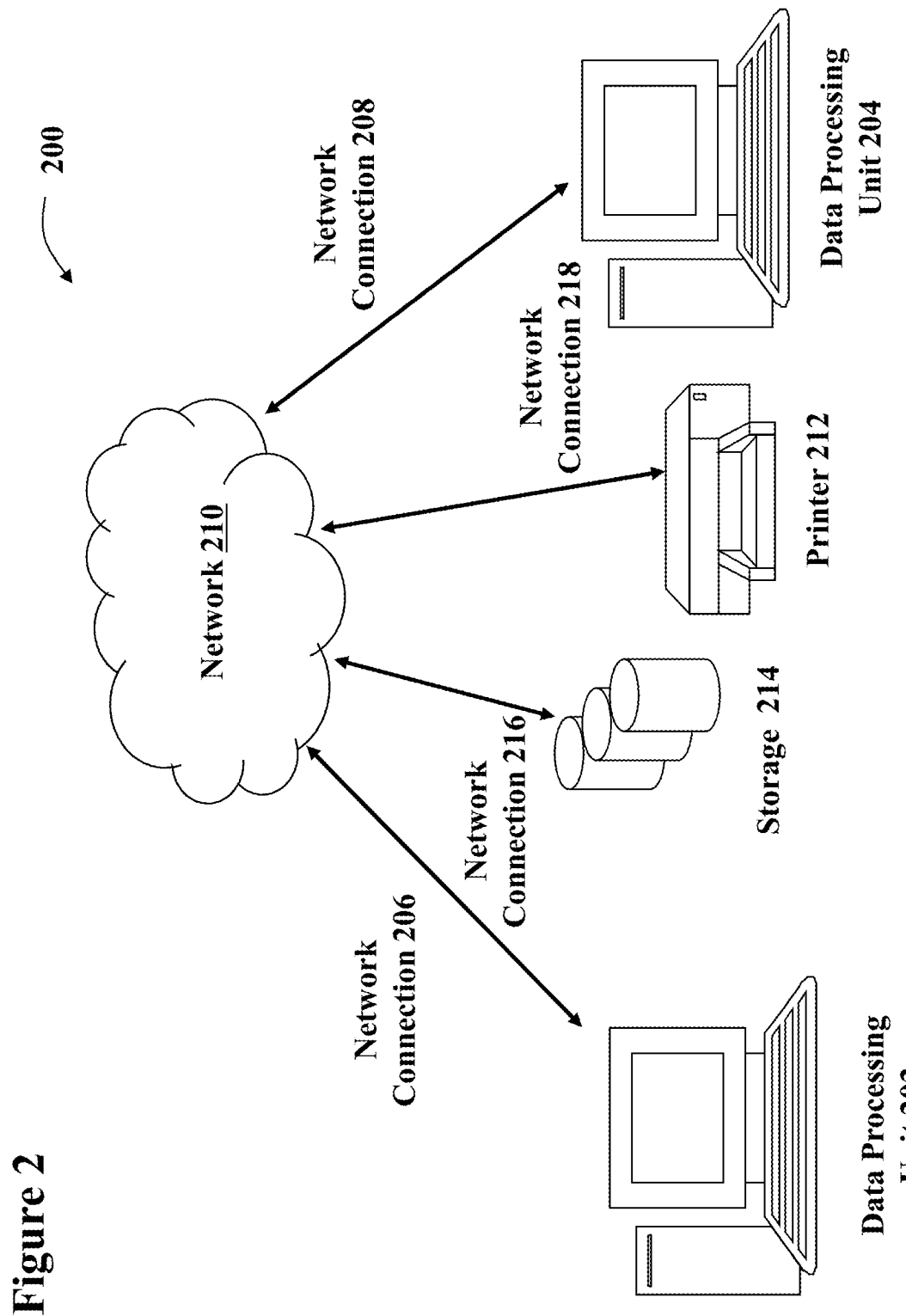
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, e.g., a local area network (LAN) or internetwork. Printer 212 and storage 214 may be connected to network 210 via network connections 216, 218. Basic network components may include network interface cards, repeaters, hubs, bridges, switches and routers. Data processing units 202, 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.). In this document, the term "web browser" is used but any application for retrieving, presenting, and traversing information resources on the Internet must be considered.

Figure 3:
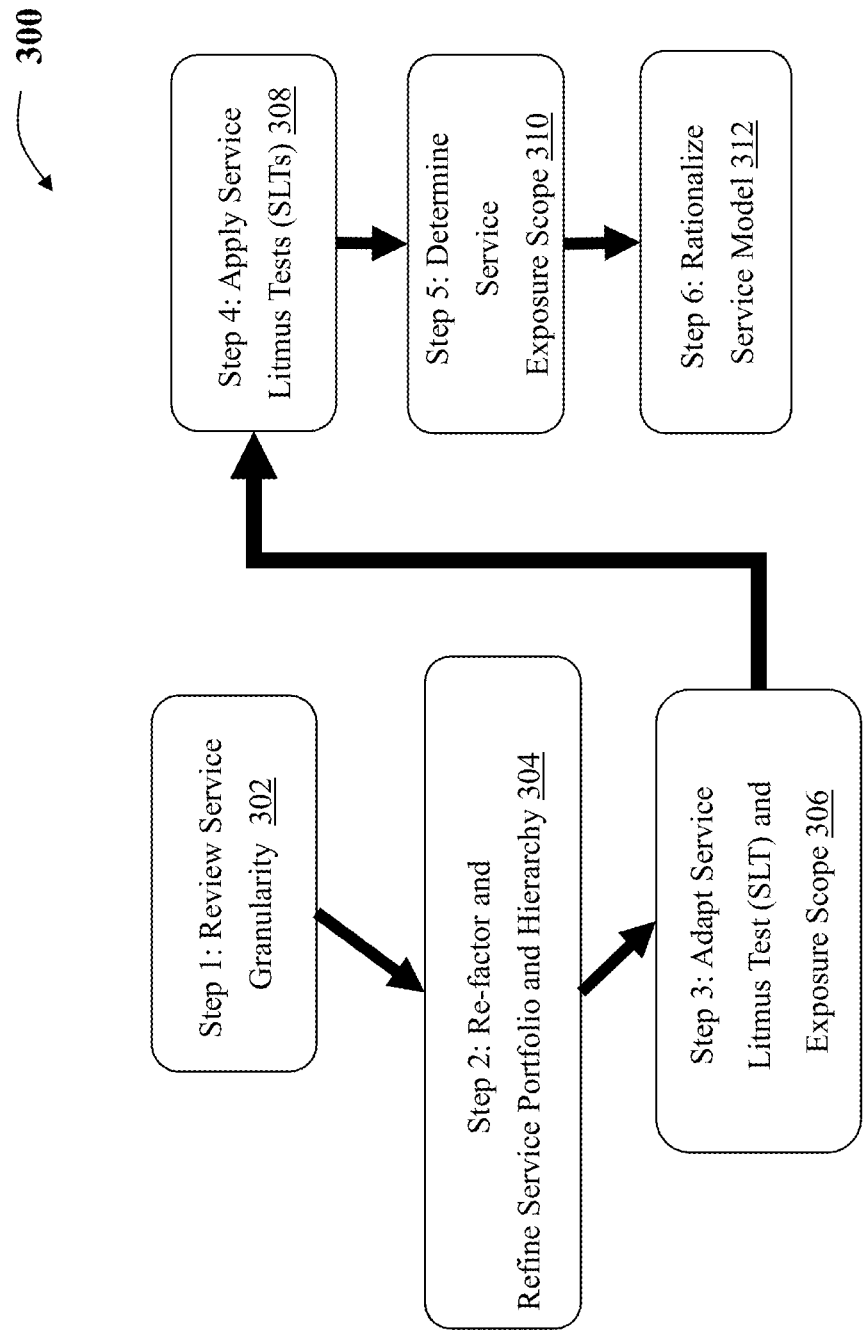
FIG. 3 illustrates an embodiment of a method of service refactoring and rationalization flow of the present invention.

FIG. 3 illustrates an embodiment of a method 300 of the present invention where the service granularity is reviewed at 302. Service granularity is essential characteristics of a service model. Services that are identified during an identification process represent business capabilities and are placed in a service hierarchy in the service model if functional areas are known and a service hierarchy is already defined. If the service hierarchy is not defined during the time of identification of the services, then the services are placed in a service hierarchy later when functional areas are identified and a service hierarchy is defined based on the functional areas. The service hierarchy in the service model represents service granularity. As one goes deeper in the hierarchy, granularity of the services is finer grained. The hierarchical service model provides a business oriented perspective of SOA representing a list of business capabilities organized and categorized in a hierarchy and relationship among these business capabilities in the hierarchy. Service granularity helps in transforming identification level service model representing business oriented perspective on SOA to specification level service model representing IT concerns. At step 2, 304, the service portfolio and hierarchy are re-factored and refined. Re-factoring and refining service portfolio and hierarchy and redefining similar services into one or more meaningful services allows for the elimination of duplication and multiple services with minor variations. Services providing same business functions can be consolidated into one service. Complimentary identification techniques results in duplicate services in service portfolio. Some steps may include eliminating and consolidating duplication and multiple services with minor variations. All of the processes and sub-processes may have potential value as services and may be added to the service portfolio as candidate services. At the end of the identification phase, a candidate service may appear to be a duplicate of some other candidate service or a slight variation of another service. An analysis of similar services is done to avoid duplication or creating many similar services with minor variations. Services providing same business functions can be consolidated into one service. The service hierarchy may be regrouped and reorganized based upon functional affinity and cohesiveness. Sometimes it may be necessary to reorganize a service portfolio. In a service portfolio, it may be necessary to create a new group of services to better represent a set of related services.

At step 3, 306, the service litmus test and exposure scope are adapted for client environment. At step 4, 308, service litmus tests are applied. At step 5, 310, the service exposure scope is determined and, at step 6, 312, the service model is rationalized. Rationalizing the service model includes verifying the validity of a service model, taking a holistic look at the entire service model, and validating and verifying with the stake holders that the services collectively meet business and technical needs including alignment, relevance, granularity and feasibility of implementation. and finally performing a baseline of the service model, goal service model. and process models in scope. Thus. service refactoring and rationalization capability pattern allows continuous feedback from the stakeholders in the software development process. "Service Litmus Test" (SLT) in the context of service refactoring and rationalization helps verify exposure decisions to avoid misalignment with business or new objectives or "proliferation of services." The key decisions to be made are which services should be funded and which ones have business value.

In theory, any candidate service could be exposed by exporting its interface as a service description, but not every candidate service should be. It may not be economically and practically feasible to do so (non-functional requirements may be compromised). A cost is associated with every service expose by the present invention.

A cost is associated with every service that is chosen to expose for governance, the underlying infrastructure (its security, performance, maintenance, monitoring and management, other SLAs) of the service, and the components that will implement them are analyzed.

There are currently six universal or standard or out-of-the-box Service Litmus Tests (SLTs) which collectively form the "gating criteria" for service exposure.

SLT1: Business Alignment
SLT2: Composability
SLT3: Externalized Service Description
SLT4: Redundancy Elimination/Reusability
STL5: Technical Feasibility
SLT6: Business Entity based Information Services In addition to this universal or standard SLT, a project or client specific or custom SLT may be defined for an engagement to support the needs of the project or client.

Each of Service Litmus Tests (SLTs) has set of questions or criterions that help decide whether a service passes the SLT. A negative response to any of the questions under a SLT results in a candidate service failing the SLT. A candidate service must pass all the universal and project or client specific SLT to be exposed. In certain cases, the client may override the exposure decision made systematically by applying the SLT. In cases where client override the exposure decision we must document the reason for the override by the client.

An sample illustration of a SLT and corresponding SLT criterion/question is provided. In SLT1: Business Alignment is an illustration of SLT. SLT ascertains that the service is traceable back to a business task or goal or it may not yield benefits required for SOA implementation. SLT has set of questions which help decide whether a service passes the SLT. An illustration of corresponding SLT questions in SLT1 are SLT1-1, SLT1-2, SLT1-3.

In SLT1-1, the service must provide a required business functionality that supports business processes and goals. There must be a business goal that the service directly (versus "inherits" from its children) supports.

In SLT1-2, the business must be willing to fund the service through its entire lifecycle: build, provisioning, management, governance, and maintenance.

In SLT1-3, the business must be willing to share the service internally or externally with clients or business partners. For example, implications may be additional costs, business secrets, security, and so on.

Figure 4:
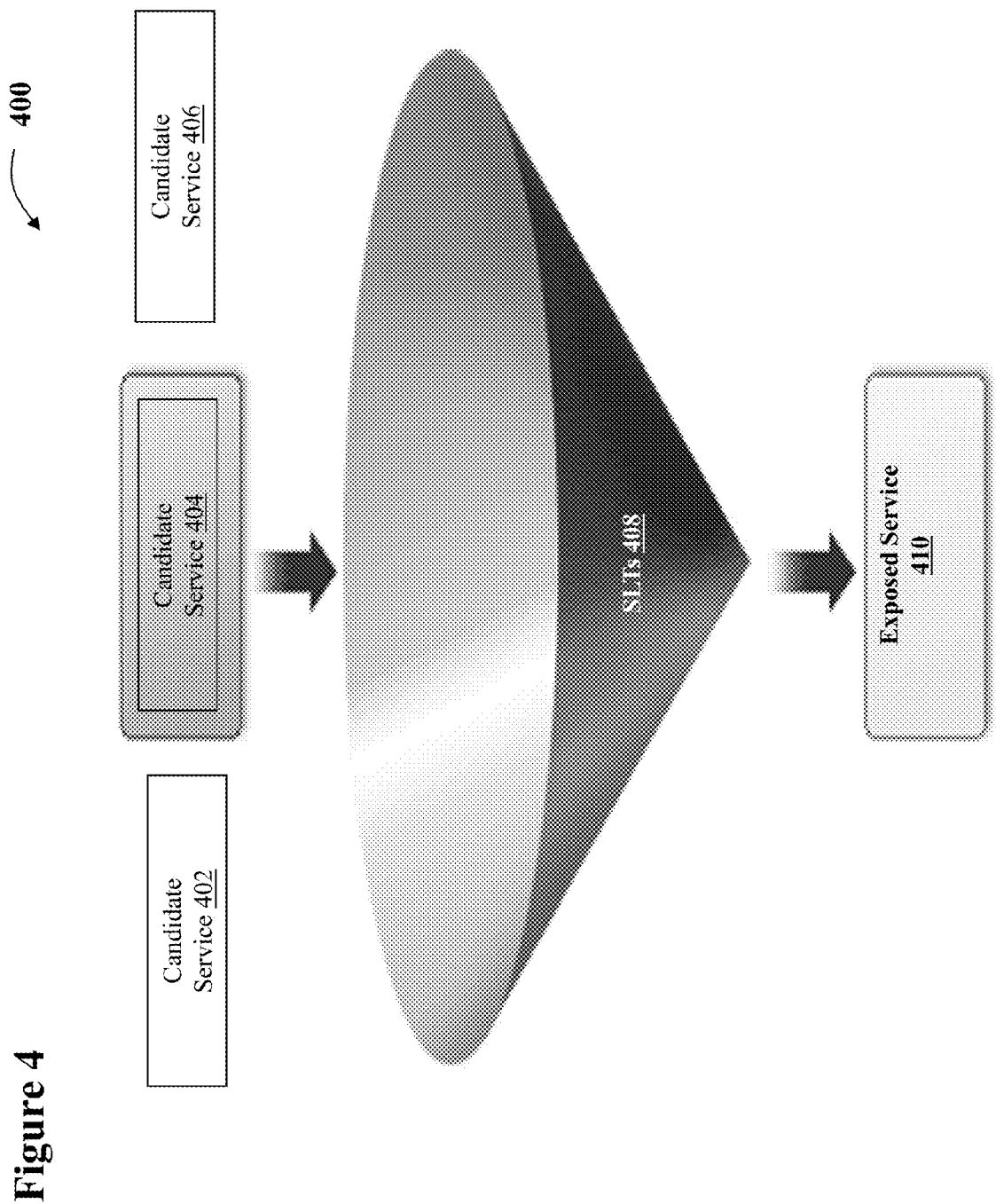
FIG. 4 illustrates a model for determining which services to expose of the present invention.

FIG. 4 illustrates a model 400 of how candidate services 402, 404, 406 are run through SLTs 408 to determine exposed services 410. Again, service litmus tests are a set of gating criteria to select and filter a set of (candidate) services, such as candidate services 402, 404, 406, from the service portfolio for exposure. These SLTs help decide whether to expose a service and, most importantly, whether to fund the creation of the service component that will provide the functionality of the service as well as the maintenance, monitoring, security, performance, and other service level agreements of the service. This decision making process is referred to as the "Service Exposure Decisions".

Figure 5:
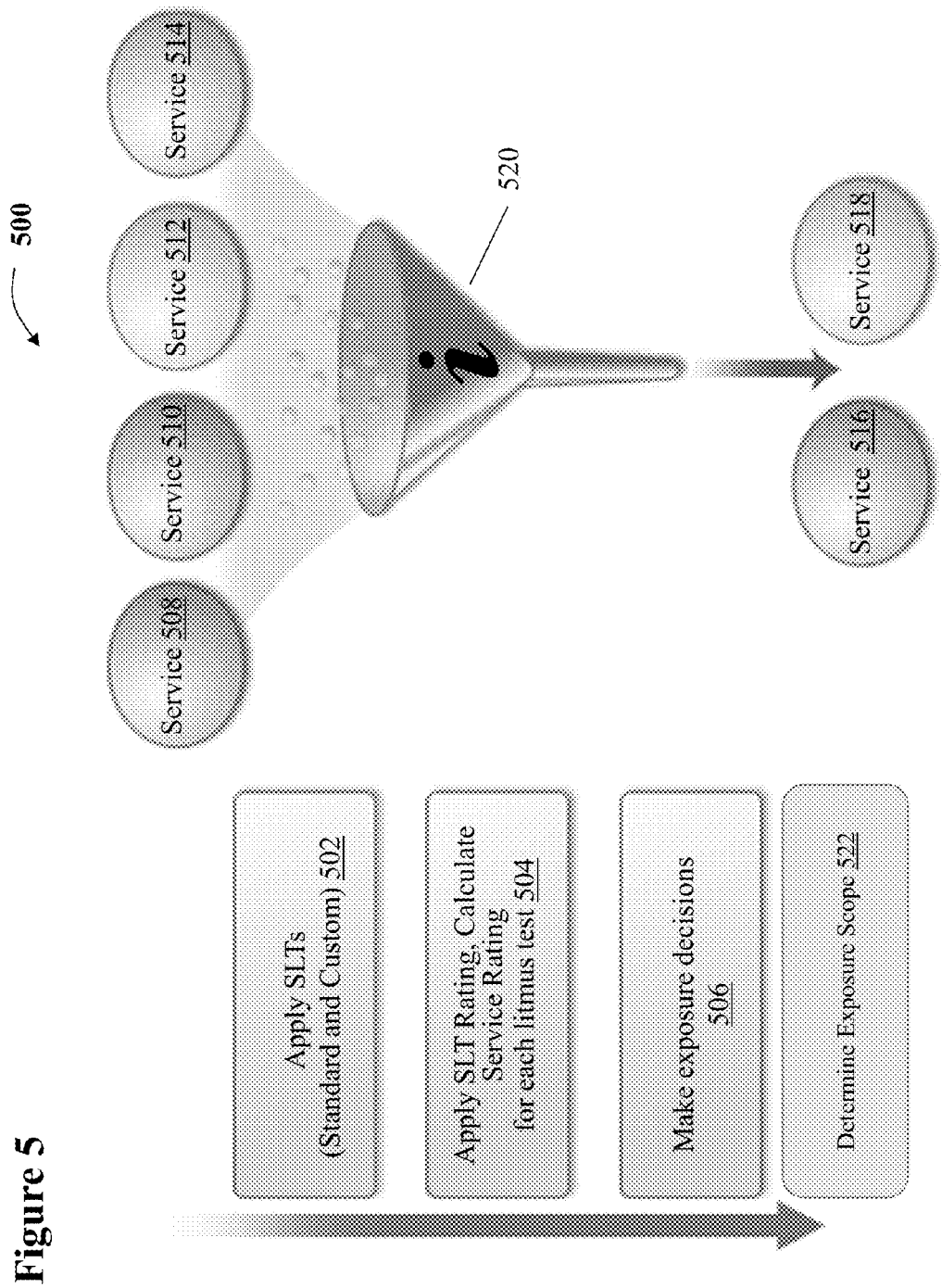
FIG. 5 illustrates another embodiment of the method and model for determining which services to expose of the present invention.
Figure 6:
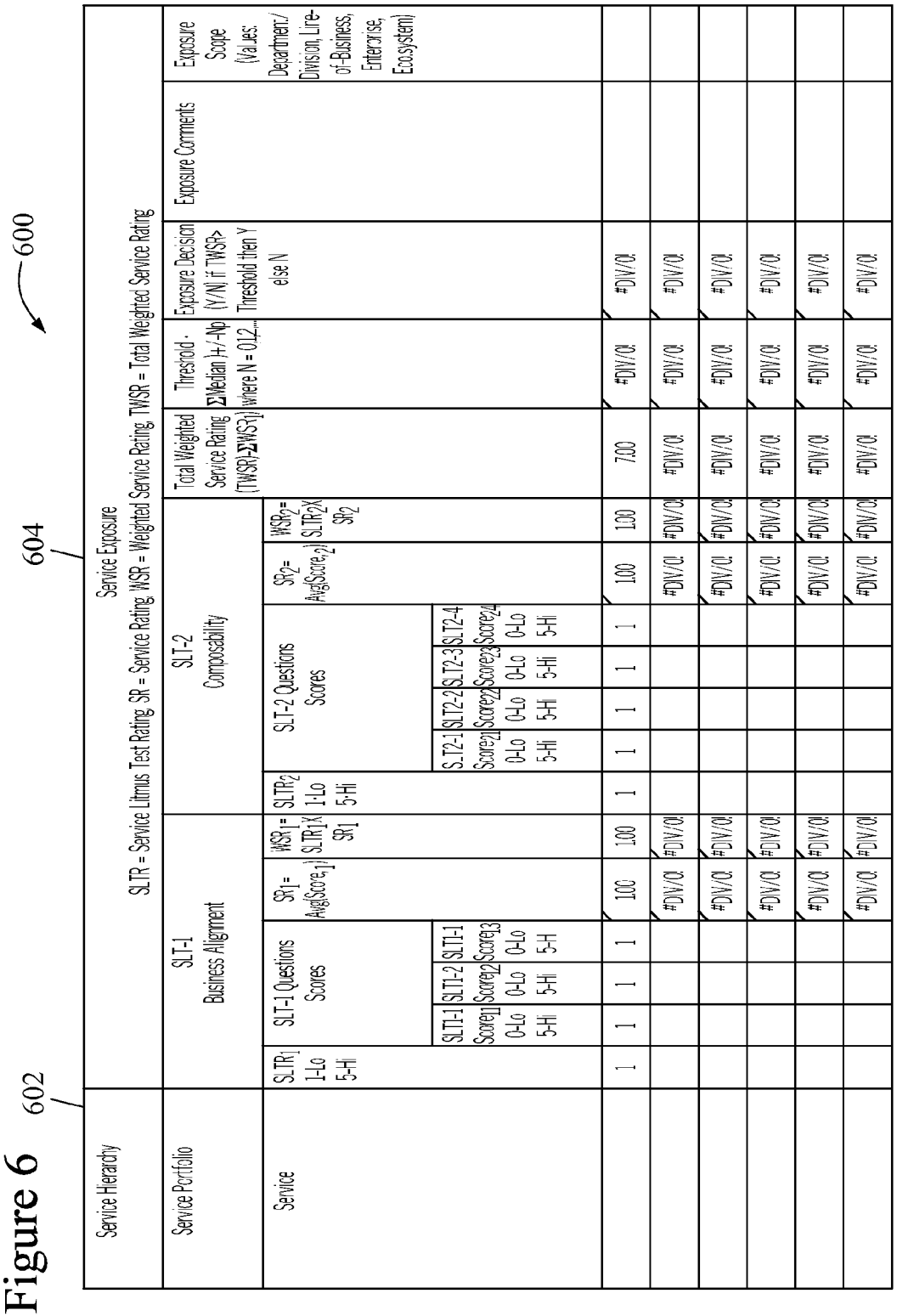
FIG. 6 illustrates a table illustrating the service hierarchy and service exposure results using the algorithms of the present invention.

FIG. 5 illustrates an embodiment of the method of the present invention 500 where SLTs (standard and custom) are applied at 502, SLT rating for each of the SLTs is defined and applied at 504 while calculating service ratings for services, and exposure decisions are made at 506. At 522, the exposure scope of the services is determined. It also illustrates a model where each of the SLT in 520 are applied to services 508, 510, 512, 514 and the exposed services shown as 516, 518. The SLT Rating (SLTR) is the relative importance/priority that client/organization assigns to a SLT. It indicates how important a given SLT is for the client. It is a relative ranking of SLTs; one SLT is more important than the other. The recommended values for this rating are 1-5 where 1=low priority, 3=medium priority, 5=high priority. The Service Rating (SR) is the assessed applicability of the given SLT to a service. It indicates how do you assess a service as satisfying the SLT. It varies from service to service for a given SLT. The values may vary between 0-5 where 0=no applicability; 1=low applicability, 3=medium applicability, 5=high applicability FIG. 6 illustrates the service exposure assessment toolkit (SEAT) 600 of the present invention showing the service hierarchy 602 and the service exposure 604 and the SLT ratings and service rating therein.

FIG. 7 illustrates a scoring table 700. Scoring table 700 may have an SLT column 702 for SLTs such as SLT1 Business Alignment 710, an SLT questions column 704 for SLT1 Business Alignment 710 such as SLT1-1 question 712, SLT1-2 question 714, and SLT1-3 question 716, a scoring level column 706 for identifying scores against SLT1-1 question 712, SLT1-2 question 714, and SLT1-3 question 716, and a comments column 708 for allowing comments against SLT1-1 question 712, SLT1-2 question 714, and SLT1-3 question 716. Field experience shows that simply answering yes or not to a SLT question is not workable and that the answers to the questions need a scale. In one embodiment of the present invention, a scoring mechanism has been defined for answers to the questions used for making assessments in the industry. The present invention defines when to score zero to five (0-5) in the scoring table 700 for each of the questions 712, 714, 716 for the SLTs. The scoring table 700 provides guidance on how to answer the questions 712, 714, 716 in a scale of 0-5 and can be adapted to meet client's needs.

Figure 8:
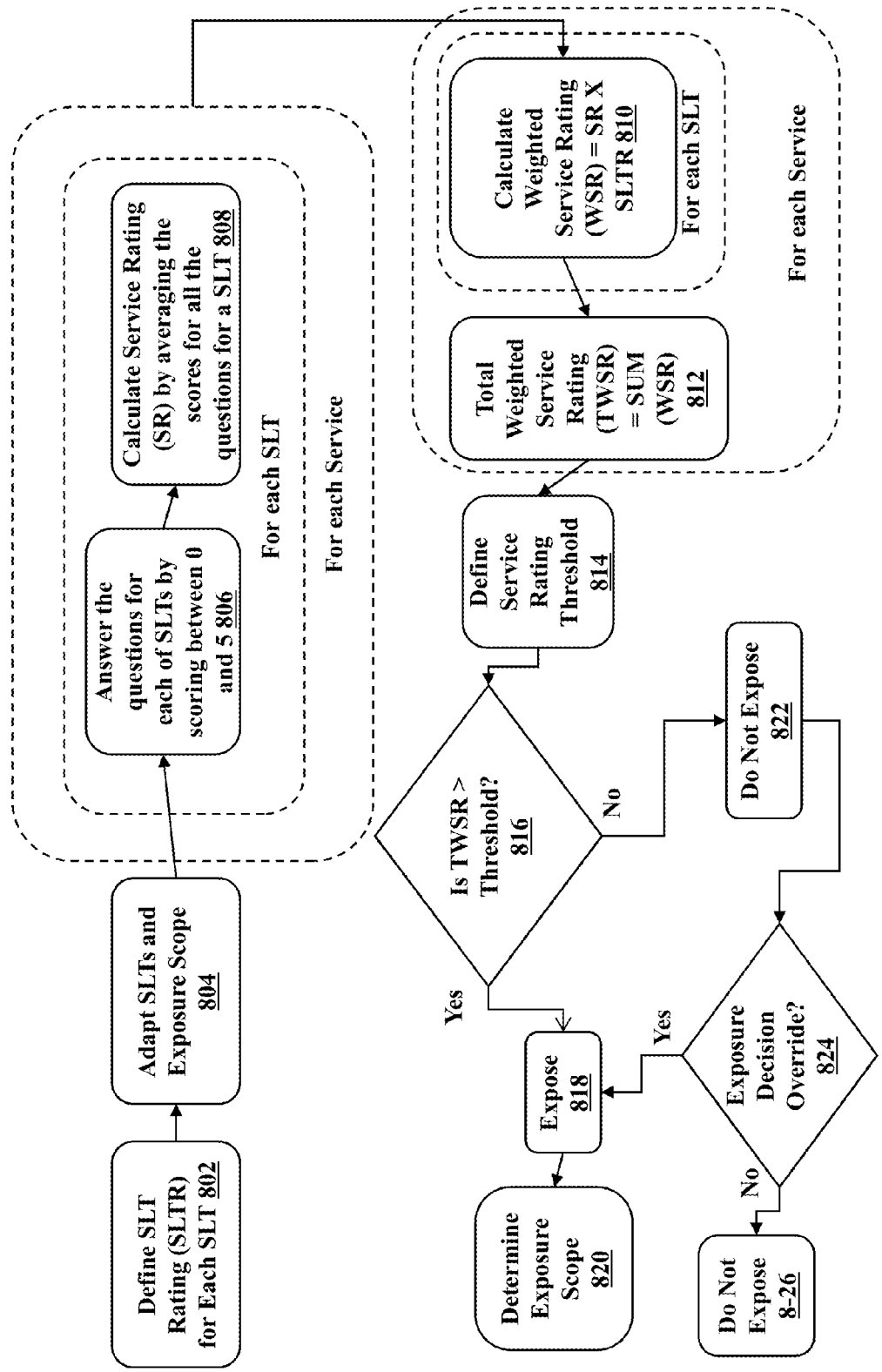
FIG. 8 illustrates another embodiment of a method for determining which services to expose or not expose of the present invention.

FIG. 8 illustrates an embodiment of a method 800 of the present invention that, at 802, SLT rating (SLTR) for each SLT are defined. At 804, SLTs and exposure scope are adapted. At 806, the questions for each of SLTs are answered by scoring between zero (0) to a five (5) rating. At 808, for each SLT and for each service, a service rating (SR) is calculated by averaging the scores for all the questions for an SLT. At 810, a weighted service rating (WSR) is calculated by the formula of SR times SLTR. At 812, total weighted service rating (TWSR) is calculated by the formula of SUM (WSR). At 814, a service rating threshold is defined. At 816, it is determined whether the TWSR value is greater than the threshold value. If the TWSR value is greater than the threshold value, the service is exposed at 818 and, at 820, the service exposure scope is determined. If the TWSR value is not greater than the threshold value, then the service is not exposed at 822. At 824, it is determined whether there is an exposure decision override and, if there is an exposure decision override, the service is exposed at 818 as discussed above. If there is no exposure decision override, the service is not exposed at 826.

FIG. 9 illustrates that service litmus test and exposure scope of the present invention can be adapted for client environment (900). There are two ways to adapt the service litmus tests first by adapting the question/criterions 930 of the universal or standard SLT 932 and then second, by defining client or project specific custom SLTs 928 based on the client environment 926. At 924, the exposure scope may be defined at department/division, line of business, enterprise, and ecosystem level and the exposure scope definition may be adapted for the client environment at 926. SLTs (Standard and Custom) are applied at 904 after the above-mentioned adaption. An SLT rating is defined for each of the service litmus tests and then SLT rating is applied at 906 while calculating a service rating for each of the services to make exposure decisions. At 908, exposure decisions are made. At 910, the exposure scope of the services is determined. Candidate services 902, such as services 912, 914, 916, 918 may be exposed based upon results of applying the service litmus test to become exposed services 920, 922.

Based on field experience, a simple yes/no answer to SLT questions/criterions is not always sufficient to make an exposure decision and hence a Service Exposure Assessment Toolkit (SEAT) has been devised. This tool kit has four key main components:

SLT Rating (SLTR)—The SLT Rating is the relative importance/priority that client/organization assigns to a SLT. It indicates how important a given SLT is for the client. It is a relative ranking of SLTs; one SLT is more important than the other. The recommended values for this rating are 1-5 where 1=low priority, 3=medium priority, 5=high priority.

Scoring Table—Field experience shows that simply answering yes or not to a SLT question is not workable and that we need a scale to answer these questions. Therefore, we have defined a scoring mechanism for answers to the questions similar to Analytic Rubrics used for making assessments in the industry. The present invention defines when to score 0-5 in the Scoring Table for each of the questions for the SLTs. The Scoring Table provides guidance how to answer the questions in a scale of 0-5 and can be adapted to meet client's need.

Service Rating (SR)—The Service Rating is the assessed applicability of the given SLT to a service. It indicates how to assess a service as satisfying the SLT. It is determined based on the answers and scoring given against the recommended values which are 0-5; 0=no applicability, 1=low applicability, 3=medium applicability, 5=high applicability. It is calculated by taking average of the scores for each of the questions.

Weighted Service Rating (WSR)—Weighted Service Rating is service rating weighted by SLT priority as captured by SLT Rating (SLTR).

Total Weighted Service Rating (TWSR)—Total Weighted Service Rating of a service is the sum of Weighted Service Rating for all the SLTs.

Service Rating Threshold—It is threshold used to filter services for exposure based on Total Weighted Service Rating of the services. Any services having TWSR greater than the threshold are exposed. The best practices for how to determine the threshold using medians and standard deviation are documented later in this document.

Service Exposure Assessment Toolkit (SEAT) model functions as follows:

Answer the questions for each of SLTs by scoring between 0 and 5.0 means Answering "No";

Average the scores for all the questions for a SLT to arrive at Service Rating (SR);

Determine the Weighted Service Rating (WSR) by multiplying Service Rating (SR) with the corresponding SLT Rating (SLTR);

Determine the Total Weighted Service Rating (TWSR) by summing Weighted Service Rating (WSR) for each of the SLTs for a service;

Determine threshold for Total Weighted Service Rating (TWSR) to make exposure decision for the services;

Make exposure decision (Pass/Fail) for the services if the Total Weighted Service Rating is greater than agreed threshold value;

SLT Rating;
It is the importance the organization assigns to a given SLT;
It indicates how important is a SLT for the client;
It is a relative ranking of SLTs; one SLT is more important than the other;
Independent of service;
The values vary between 1-5:
   1=low priority;
   3=medium priority; and
   5=high priority;
Service Rating:
It is the assessed applicability of the given SLT to a service;
It indicates how do you assess a service as satisfying the SLT;
It varies from service to service for a given SLT;
The values may vary between 0-5;
   0=no applicability;
   1=low applicability;
   3=medium applicability; and
   5=high applicability.

Steps in Service Exposure Assessment Toolkit (SEAT) may include the following:

Apply all universal and project/client specific service litmus tests to all the services in the portfolio as follows:

1. Rate all the service litmus tests: Determine the SLT Rating (SLTR) for each of the SLTs—universal and project/client specific. The SLT Rating is the relative importance/priority that client/organization assigns to a SLT. It indicates how important a given SLT is for the client. It is a relative ranking of SLTs; one SLT is more important than the other. The recommended values for this rating are 1-5 where 1=low priority, 3=medium priority, 5=high priority.

2. Answer the questions for each of SLTs by scoring between 0 and 5. Put score of 0 if the question does not apply to the service or the answer is no. Use scoring table and guidance provided in the table to determine how to score the question between 0-5.

3. Average the scores for all the questions for a SLT to arrive at Service Rating (SR):
   $SR=Avg(Score_j)$ where $1<=j<=$# of questions for a given ST 4. Determine the Weighted Service Rating (WSR) by multiplying Service Rating (SR) with the corresponding SLT Rating (SLTR):
   $WSR=SLTR \times SR$ 5. Determine the Total Weighted Service Rating (TWSR) by summing Weighted Service Rating (WSR) for each of the SLTs for a service:

TWSR=SWSR$_j$ where 1<=j<=# of SLTs

6. Repeat 2-5 for each of the services.

Additional steps in Service Exposure Assessment Toolkit (SEAT) may include:

7. Determine threshold for Total Weighted Service Rating (TWSR) to make exposure decision for the services. The services having TWSR greater than threshold are exposed. As a best practice, sum of the medians of Weighted Service Rating across all services could or a deviation from the sum of the median can be used as a starting threshold.

Median$_j$=Median(WSR$_i$) where, 1<=i<=# of Services 1<=j<=# of SLTs

Standard Deviation in TWSR=s(TWSRi) where, 1<=i<=# of Service

Threshold=SMedian$_j$ where, 1<=j<=# of SLTs where, 1<=j<=# of SLTs

Or Threshold=SMedian$_j$±N×s(TWSR$_i$) where, 1<=j<=# of SLTs 1<=i<=# of Services N=any positive integral number 8. Make exposure decision for the services if the Total Weighted Service Rating is greater than agreed threshold value.

9. Business may override the exposure decisions. If so, capture the reasons for the override.

With regard to Service Exposure Scope, designation of service exposure is not adequate to specify who can use the service. In addition to service exposure decision, at what level of scope the service is being designed to be exposed needs to be specified. Service exposure scope identifies the scope of the exposure for the (exposed) services. The exposure scope affects the non-functional requirements (e.g. security requirement) of the services. The exposure scopes that are predefined are:

Division/Department: Services that are exposed to only a division or a department of an enterprise.

Line of Business: Services that are exposed to a line of business of an enterprise Enterprise: Services that are exposed to enterprise.

Ecosystem: Services that are exposed to entire ecosystem including enterprises and their trading partners.

The overall flow of the service refactoring and rationalization repeatable process or capability pattern are:

Step 1: Review Service Granularity: Decide whether services are identified at the right level of granularity which may include the following sub-steps:

Review the service model to ensure that the services are at the right level of granularity. The right or best granularity for a service can only be specified in the context of its function and foreseeable usage in processes and use cases (usage scenarios/service consumer view). The sub-steps are:

Use the service usage scenarios to ensure service consumers will generally find the service to be at the right level of granularity;

Use non-functional requirements to help drive the granularity: Finer grained services will tend to create more network chatter. Courser grained services will tend to perform better.

Step 2: Re-factor and refine service portfolio and hierarchy which may include the following sub-steps:

Re-factor, refine, and redefine similar services into one or more meaningful services to eliminate duplication and multiple services with minor variations. Services providing same business functions can be consolidated into one service. Complimentary identification techniques results in duplicate services in service portfolio. The sub-steps are:

Eliminate and consolidate duplication and multiple services with minor variations: All of the processes and sub-processes have potential value as services and are added to the Service Portfolio as candidate services. At the end of the identification phase, a candidate service may appear to be a duplicate of some other candidate service or a slight variation of another service. An analysis of similar services needs to be done to avoid duplication or creating many similar services with minor variations. Services providing same business functions can be consolidated into one service.

Regroup and reorganize service hierarchy: Regroup and reorganize service hierarchy based on functional affinity and cohesiveness. Some times it may be necessary to reorganize a service portfolio. In a service portfolio it may be necessary to create a new group of services to better represent a set of related services.

Step 3: Adapt service litmus test and exposure scope

Step 4: Apply Service Litmus Test

Make service exposure decisions through applying the service litmus tests (SLT). The SLT assists in deciding whether a candidate service should actually be exposed—built, deployed, published for discovery. Apply the Service Exposure Assessment Toolkit (SEAT) to assess whether services are business aligned, composable, have externalized service description, reusable, technically feasible and so forth. The steps are:

Apply all universal and project/client specific service litmus tests to all the services in the portfolio using Service Exposure Assessment Toolkit (SEAT).

Step 5: Determine Service Exposure Scope

Designation of service exposure in itself is not adequate to specify who can use the service.

In addition to that, specify at what level of scope the service is being designed to be exposed.

This is achieved by defining Service Exposure Scope.

Service exposure can occur at multiple scopes:

Department/Division

Line of Business

Enterprise

Eco-system

Step 6: Rationalize Service Model

Verify the validity of service model.

Take holistic look at the entire service model and validate and verify with the stake holders that the services collectively meet business and technical needs including alignment, relevance, granularity, and feasibility of implementation.

Thus Service Refactoring and Rationalization capability pattern allows continuous feedback from the stakeholders in the software development process Baseline the service model and goal service model and process models in scope.

SLT Considerations and Best Practices may include the following:

Application of Service Litmus Tests is event driven and is applied iteratively.

For the first phase of elaboration, decisions should be made based on current knowledge. Service Litmus Tests should then be revisited as more information is obtained throughout the design process.

Service Litmus Tests for each candidate service should be applied and reviewed with the appropriate Subject Matter Experts or Stakeholders.

Reviewing results of the Service Litmus Tests are a useful way to track the appropriateness of the criteria and service granularity. For example, if too many candidate services are passing a particular test, that test definition may be too broad or the service level granularity may be inappropriate.

A service may fail one or more of the Service Litmus Tests but may still be exposed due to some project specific decision (business or IT). This is okay. There may be an architectural or business decision made to expose a service despite the Service Litmus Tests.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and, obviously, many modifications and variations are possible. Such modifications and variations that may be apparent to a person skilled in the art are intended to be included within the scope of the invention as defined by the accompanying claims.

What is claimed is:

1. A method for determining which services in a service model to expose, the method comprising:
    determining a granularity of one or more services of the service model;
    re-factoring and refining a service portfolio and a hierarchy of the service model, wherein the re-factoring and refining comprises at least one of: eliminating at least one duplicate service and consolidating at least one set of services having a minor variation;
    adapting a Service Litmus Test (SLT) and service exposure scope to the service model, wherein at least one SLT is a project or client customized SLT defined for an engagement to support a need of the project or client;
    applying Service Litmus Tests (SLTs) to the service model, wherein each SLT applied to the service model is rated with an applicability of the SLT to the services; and
    verifying, with each affected stakeholder associated with the service model, that the service model achieves business and technical needs based on the results of the SLTs, which include tests to make exposure decisions, including whether to expose the service or not expose the service, wherein the services represent business capabilities and are placed in the hierarchy of the service model which represents the granularity.

2. The method as defined in claim 1 further comprising exposing the one or more services based upon the application of the SLTs.

3. The method as defined in claim 1 further comprising applying an SLT rating, calculating a service rating, and making exposure decisions.

4. The method as defined in claim 1 further comprising:
    answering a set of questions for each of the SLTs;
    generating a scoring between 0 and 5 based on the answers to the set of questions; and
    calculating a Service Rating (SR) by averaging the scores for all the set of questions for a SLT.

5. The method as defined in claim 4 further comprising, for each service, calculating a Weighted Service Rating (WSR) by multiplying the SR by an SLT rating (SLTR) and calculating a Total Weighted Service Rating (TWSR), which equals the summation of the WSR.

6. The method as defined in claim 5 further comprising:
    defining a Service Rating Threshold;
    determining if the TWSR has a greater value than the Service Rating Threshold; and
    exposing the service and determining exposure scope in the case that the TWSR has a greater value than the Service Rating Threshold.

7. The method as defined in claim 6 further comprising:
    in the case that the TWSR does not have a greater value than the Service Rating Threshold, not exposing the service; and
    determining if there is an exposure decision override and, if so, exposing the service or, if not, not exposing the service.

8. A computer program product stored on a computer readable storage device, wherein the computer readable storage device is not a transitory signal, for implementing a method to re-factor, rationalize, and prioritize a service model and a toolkit to assess service exposure in the service model, the service model determining which service to expose, the computer program product comprising:
    a computer readable storage media;
    program instructions for determining a granularity of the one or more services of the service model;
    program instructions for re-factoring and refining a service portfolio and a hierarchy of the service model, wherein the re-factoring and refining comprises at least one of: eliminating at least one duplicate service and consolidating at least one set of services having a minor variation;
    program instructions for adapting a Service Litmus Test (SLT) and service exposure scope to the service model, wherein at least one SLT is a project or client customized SLT defined for an engagement to support a need of the project or client;
    program instructions for applying Service Litmus Tests (SLTs) to the service model, wherein each SLT applied to the service model is rated with an applicability of the SLT to the services;
    program instructions for determining service exposure scope of the service model;
    program instructions for verifying, with each affected stakeholder associated with the service model, that the service model achieves business and technical needs based on the results of the SLTs, which include tests to make exposure decisions, including whether to expose the service or not expose the service, wherein the services represent business capabilities and are placed in the hierarchy of the service model which represents the granularity.

9. The computer program product stored on the computer readable storage device as defined in claim 8 further comprising program instructions for exposing one or more services based upon the application of the SLTs.

10. The computer program product stored on the computer readable storage device as defined in claim 9 further comprising program instructions for applying an SLT rating, calculating a service rating and making exposure decisions.

11. The computer program product stored on the computer readable storage device as defined in claim 9 further comprising program instructions for:

receiving a set of answers to a set of questions for each of the SLTs;

generating a scoring between 0 and 5 based on the set of answers to the set of questions; and calculating a Service Rating (SR) by averaging the scores for all the set of questions for a SLT.

12. The computer program product stored on the computer readable storage device as defined in claim 11 further comprising program instructions for, for each service, calculating a Weighted Service Rating (WSR) by multiplying SR by an SLT rating (SLTR) and calculating a Total Weighted Service Rating (TWSR) which equals the summation of the WSR.

13. The computer program product stored on the computer readable storage device as defined in claim 12 further comprising program instructions for defining a Service Rating Threshold, determining if the TWSR has a greater value than the Service Rating Threshold and if the TWSR has a greater value than the Service Rating Threshold, exposing the service and determining exposure scope.

14. The computer program product stored on the computer readable storage device as defined in claim 13 further comprising program instructions for, if the TWSR does not have a greater value than the Service Rating Threshold, not exposing the service, determining if there is an exposure decision override and, if so, exposing the service or, if not, not exposing the service.

15. A method for deploying a computing infrastructure comprising integrating computer-readable code into a computing system, wherein the code in combination with the computing system is capable of assessing service exposure in the service model and determining which services to expose, the process comprising:

providing a computer infrastructure being operable to:

determine a granularity of one or more services of the service model;

re-factor and refine a service portfolio and a hierarchy of the service model, wherein the re-factoring and refining comprises at least one of: eliminating at least one duplicate service and consolidating at least one set of services having a minor variation;

adapt a Service Litmus Test (SLT) and service exposure scope to the service model, wherein at least one SLT is a project or client customized SLT defined for an engagement to support a need of the project or client;

apply Service Litmus Tests (SLTs) to the service model, wherein each SLT applied to the service model is rated with an applicability of the SLT to the services; and verify, with each affected stakeholder associated with the service model, that the service model achieves business and technical needs based on the results of the SLTs, which include tests to make exposure decisions, including whether to expose the service or not expose the service, wherein the services represent business capabilities and are placed in the hierarchy of the service model which represents the granularity.

16. The method as defined in claim 15 wherein the computer infrastructure is further operable to expose the one or more services based upon the application of the SLTs.

17. The method as defined in claim 16 wherein the computer infrastructure is further operable to apply an SLT rating, calculating a service rating and making exposure decisions.

18. The method as defined in claim 17 wherein the computer infrastructure is further operable to:

receive a set of answers to a set of questions for each of the SLTs;

generate a scoring between 0 and 5 based on the set of answers to the set of questions; and calculate a Service Rating (SR) by averaging the scores for all the set of questions for a SLT.

19. The method as defined in claim 18 wherein the computer infrastructure is further operable to, for each service, calculate a Weighted Service Rating (WSR) by multiplying SR by an SLT rating (SLTR) and calculate a Total Weighted Service Rating (TWSR), which equals the summation of the WSR.

20. The method as defined in claim 19 wherein the computer infrastructure is further operable to define a Service Rating Threshold, determine if the TWSR has a greater value than the Service Rating Threshold and if the TWSR has a greater value than the Service Rating Threshold, expose the service and determining exposure scope.

* * * * *